US 6,573,860 B1

(12) United States Patent
Winter et al.

(10) Patent No.: US 6,573,860 B1
(45) Date of Patent: Jun. 3, 2003

(54) DEVICE FOR ADJUSTING A BEAM SYSTEM

(75) Inventors: Klaus Winter, Schwieberdingen (DE); Hermann Mayer, Vaihingen (DE); Bernhard Lucas, Besigheim (DE); Thomas Beez, Weinsberg (DE); Herbert Olbrich, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,991

(22) PCT Filed: Nov. 25, 2000

(86) PCT No.: PCT/DE00/04189

§ 371 (c)(1),
(2), (4) Date: Dec. 11, 2001

(87) PCT Pub. No.: WO01/47062

PCT Pub. Date: Jun. 28, 2001

(30) Foreign Application Priority Data

Dec. 21, 1999 (DE) .......................... 199 61 774

(51) Int. Cl.[7] ................................. G01S 7/28
(52) U.S. Cl. .............................. 342/70; 342/71; 342/72; 342/175
(58) Field of Search .............................. 342/70, 71, 72, 342/74, 75, 81, 153, 157, 158, 175, 368, 371, 372; 343/757, 758, 761, 762, 765, 766

(56) References Cited

U.S. PATENT DOCUMENTS

| 3,568,184 | A | * | 3/1971 | Drabowitch | ................ 342/157 |
| 4,500,882 | A | * | 2/1985 | Katagi et al. | ............... 342/372 |
| 4,717,918 | A | * | 1/1988 | Finken | ........................ 342/368 |
| 4,796,031 | A | * | 1/1989 | Koki | ........................... 342/148 |
| 5,926,127 | A |   | 7/1999 | Schmidt et al. | ............... 342/70 |
| 6,034,642 | A | * | 3/2000 | Kojima et al. | .............. 343/753 |

FOREIGN PATENT DOCUMENTS

| DE | 42 01 214 | 2/1993 |
| DE | 690 17 043 | 9/1995 |
| DE | 196 42 810 | 4/1998 |
| EP | 0 805 360 | 11/1997 |
| WO | WO 98 40 761 | 9/1998 |

* cited by examiner

Primary Examiner—John B. Sotomayor
(74) Attorney, Agent, or Firm—Kenyon & Kenyon

(57) ABSTRACT

A device for adjusting a beam system is proposed including a base having at least one beam source, and at least three supporting elements, which fix the base to a carrier, each length of the at least three supporting elements being capable of being changed selectively and independently of one another in order to change the distance of the at least one beam source from a focusing arrangement, and in order to change the alignment of the at least one beam source in relation to the focusing arrangement.

14 Claims, 2 Drawing Sheets

DEVICE FOR ADJUSTING A BEAM SYSTEM

FIELD OF THE INVENTION

The present invention relates to a device for adjusting a beam system. Such devices are particularly used in radar systems in motor vehicles for supporting the driver, e.g. by detecting objects, determining distances, determining direction, and/or measuring speed.

BACKGROUND INFORMATION

To correctly adjust a radar system in a motor vehicle to the road, a device is known from German Patent No. 42 01 214 where the orientation of the entire radar system is changed with respect to the motor vehicle—in the manner of adjusting a vehicle headlight.

If, however, the emitted radar beam is to maintain a desired characteristic property (antenna lobe), a geometric alignment of the beam source and the focusing arrangement relatively to one another is performed. Different adjusting mechanisms are already known for this purpose. From German Patent No. 690 17 043, a radar system is known where the beam source and the antenna lens are each attached at the ends of two tubes that are arranged coaxially with respect to one another and whose axial distance can be changed. By axially displacing the tubes relatively to one another, along the geometric axis of symmetry of the antenna lens, the beam angle of the antenna lobe can be changed. German Patent No. 196 42 810 describes an adjusting device where the beam source can be moved in a plane perpendicular to the radiation axis, relative to the antenna lens. In this context, the beam source is located on a base plate, which can be displaced by two wedge-shaped sliders, which can be moved by a threaded rod. As a result, it is possible to manually adjust the beam source and the antenna lens in a desired principal beam direction. According to another variation described there, the beam source can be tilted in three directions with respect to the radiation axis. For this purpose, the beam source is arranged on the flat surface of a base in the shape of a spherical segment, the base being able to rotate via two threaded members, which are offset relatively to one another at right angles at the periphery of the base, and which each counteract an opposite spring element.

In the case of the indicated adjusting device, it is disadvantageous that it does not permit changing the position of the beam source in the direction of the radiation axis while simultaneously rotating the beam source with respect to the radiation axis, so that the radar beam cannot be simultaneously tilted and expanded. This limits the possibilities for using the radar system in a motor vehicle, e.g. for measuring distance.

The present invention is associated with a series of advantages. Thus, as a result of the base, which is fixed by at least three supporting elements, the beam source can be freely moved relative to the lens axis. In a targeted manner, the beam can be tilted and the focusing can be changed to expand the beam. The beam system can be electrically calibrated or adjusted. Thus, the radiation pattern, i.e., the local measuring range, can be changed while the beam system is in operation.

DETAILED DESCRIPTION

Figure 1:
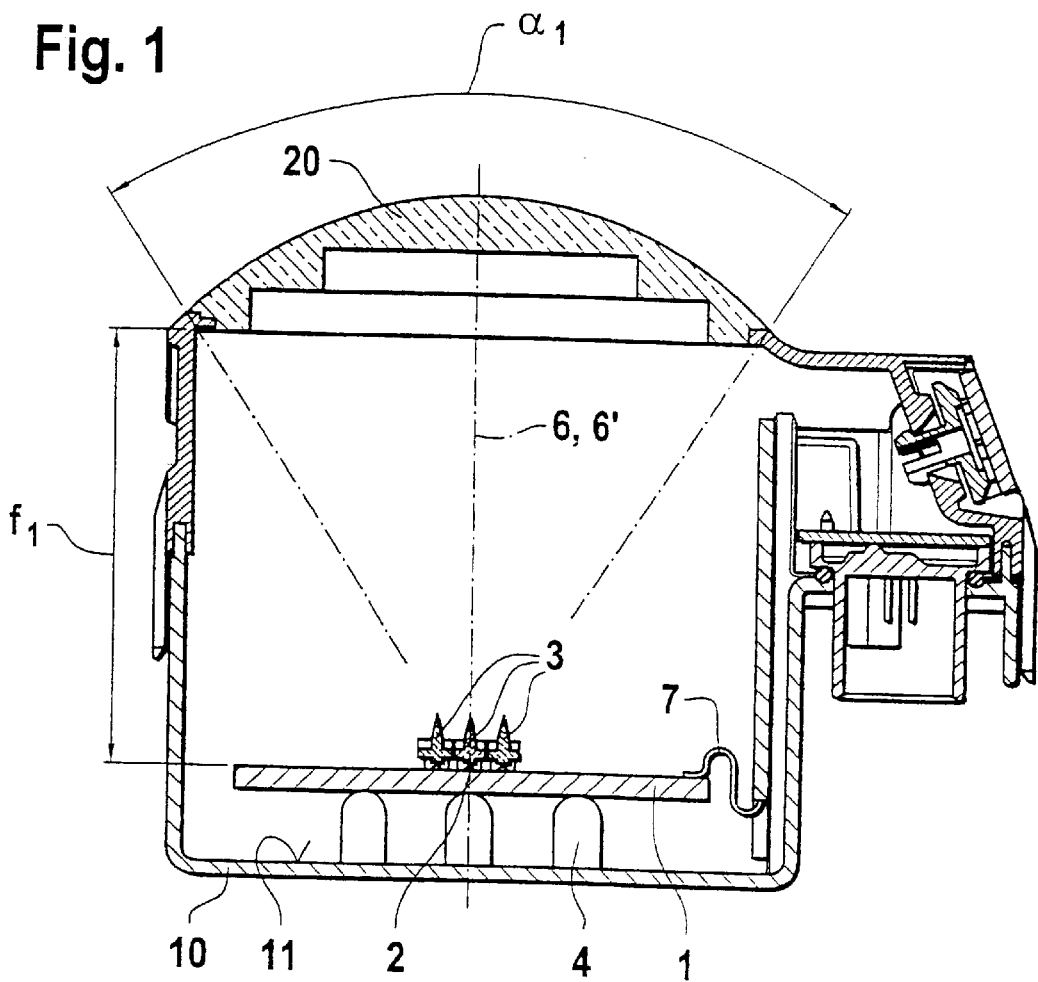
FIG. 1 shows a longitudinal cross section of a beam system having the adjusting device according to the present invention.

In the beam system according to FIG. 1, a base 1, which supports one or more beam sources 2 as well as pre-focusing elements 3, is attached to three supporting elements 4 on an inner side 11 of a carrier 10, which forms the housing of the beam system. The length of each supporting element 4 can be changed selectively and independently of one another, so the distance and the alignment of base 1 can be adjusted in relation to focusing lens 20. As a result of the three supporting elements 4 being situated on a circular line 5, base 1 is mounted on gimbals with respect to carrier 10 and, thus, also with respect to focusing lens 20. The center of circle 5 is on geometric axis of symmetry 6 of focusing lens 20. Base 1 is electrically connected to the remaining electronics of the beam system via a flexible line 7. Supporting elements 4 can be electronically adjusted from outside of carrier 10. Supporting elements 4 are formed by piezo elements, electrical linear motors, and/or toothed-rack elements driven by a stepper motor.

Figure 2:
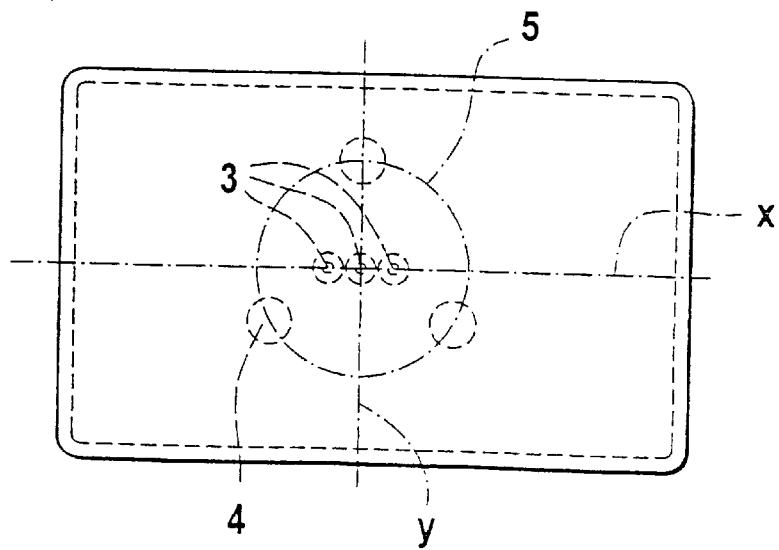
FIG. 2 shows a top view of the adjusting device according to the present invention.

FIG. 2 shows supporting elements 4 situated on circle 5 on the back of base 1.

Figure 3:
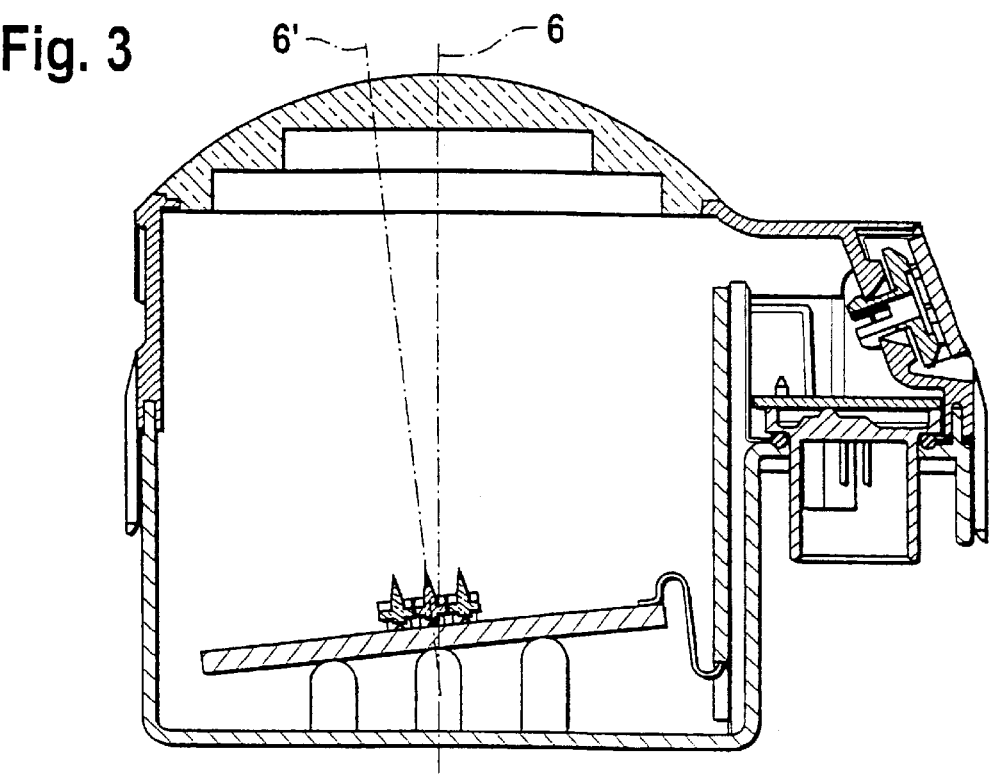
FIG. 3 shows the base being tilted with respect to the geometric axis of symmetry.

In a starting position (see FIG. 1), supporting elements 4 hold base 1 including beam sources 2 at a distance of $f_1$ from antenna lens 20, thereby yielding a beam half width or an beam angle $\alpha_1$. By differently lengthening or shortening the three supporting elements 4, base 1 can be spatially tilted relatively to antenna lens axis 6 (the geometric axis of symmetry), e.g. about axis x-x, y-y or about both at the same time (see FIG. 3). Associated with this tilting is also a tilting of the beam passing through antenna lens 20, i.e., beam axis 6' (i.e., the principal beam direction) and antenna lens axis 6 deviate from one another. This effect can be used, for example, to compensate for manufacturing tolerances of the beam system in the motor vehicle, i.e., to adjust or to scan a certain angular range in a targeted manner in order to expand the detecting range of the beam system.

Figure 4:
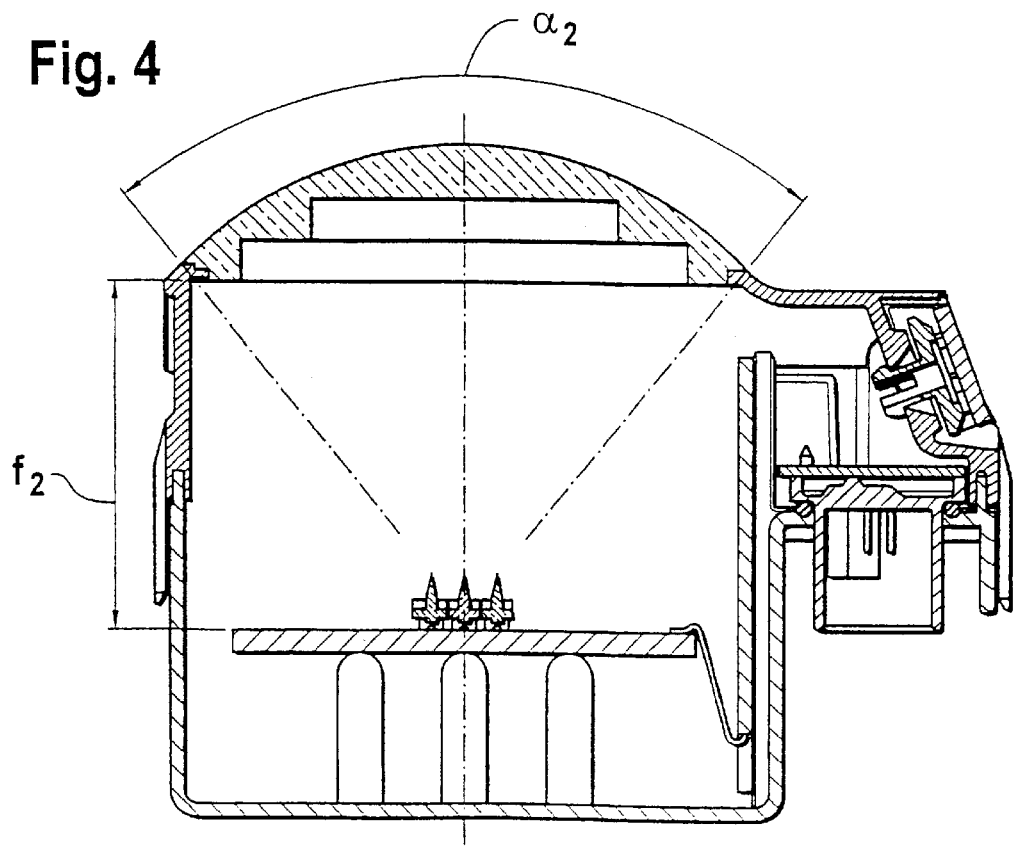
FIG. 4 shows the base being displaced in the direction of the geometric axis of symmetry.

By equally and equidirectionally changing the lengths of all supporting elements 4, the focusing of beam sources 2 can be changed in a targeted manner, see FIG. 4. Adjusting focus length $f_2$ results in a widening of the beam to a beam half width of $\alpha_2$. This can be used to further enlarge the detecting range, e.g. for near-field detection in the case of the motor vehicle traveling at low speeds.

Since supporting elements 4 can be electronically controlled, radiation methods can also be achieved in which the detecting range can be expanded or restricted by sequentially changing beam half width $\alpha_1$ or $\alpha_2$, thereby making it possible for objects outside of a certain standard detecting range to also be detected. By cyclically changing the focus length, a series of different detecting ranges can be achieved, thereby making it possible to switch back and forth between a "wide-angle view" and a "long-range view," for example.

The device according to the present invention is particularly advantageous in a radar beam system for measuring distance and/or speed in a motor vehicle.

What is claimed is:

1. A device for adjusting a beam system, comprising:
   a base including at least one beam source;
   a carrier;
   at least three supporting elements for fixing the base to the carrier; and
   a focusing arrangement, wherein:
      each length of the at least three supporting elements can be changed selectively and independently of one another in order to change a distance of the at least one beam source from the focusing arrangement, and in order to change an alignment of the at least one beam source in relation to the focusing arrangement.

2. The device according to claim 1, wherein:
   the at least three supporting elements are situated equidistant to one another on a circle on an inner side of the carrier, and
   a center of the circle is on an axis of symmetry of the focusing arrangement.

3. The device according to claim 1, wherein:
   the carrier is a closed housing.

4. The device according to claim 1, wherein:
   the at least three supporting elements can be adjusted from outside of the carrier.

5. The device according to claim 1, wherein:
   the at least three supporting elements include at least one of piezo elements, electrical linear motors, and toothed-rack elements driven by stepper motors.

6. The device according to claim 1, wherein:
   each of the at least three supporting elements can be electronically controlled.

7. The device according to claim 1, further comprising:
   a flexible line by which the base is connected to the carrier.

8. The device according to claim 1, wherein:
   a beam angle of the beam system can be changed by equally and equidirectionally changing each length of the at least three supporting elements.

9. The device according to claim 1, wherein:
   a principal beam direction of the beam system can be changed by variably changing each length of the at least three supporting elements.

10. A beam system, comprising:
    a device that includes:
       a base including at least one beam source;
       a carrier;
       at least three supporting elements for fixing the base to the carrier; and
       a focusing arrangement, wherein:
          each length of the at least three supporting elements can be changed selectively and independently of one another in order to change a distance of the at least one beam source from the focusing arrangement, and in order to change an alignment of the at least one beam source in relation to the focusing arrangement.

11. The beam system according to claim 10, wherein:
    the focusing arrangement is disposed on the carrier.

12. The beam system according to claim 10, wherein:
    the beam system is configured for measuring at least one of a distance and a speed in a motor vehicle.

13. A radar system serving as a distance sensor for a motor vehicle, comprising:
    a device including:
       a base including at least one beam source;
       a carrier;
       at least three supporting elements for fixing the base to the carrier; and
       a focusing arrangement, wherein:
          each length of the at least three supporting elements can be changed selectively and independently of one another in order to change a distance of the at least one beam source from the focusing arrangement, and in order to change an alignment of the at least one beam source in relation to the focusing arrangement.

14. A radar method for a road vehicle, comprising the step of:
    sequentially changing a detecting range of a beam system by changing at least one of a principal direction of a beam source relative to an antenna lens, and
    a beam angle $\alpha$ by altering the relative distance between the beam source and the antenna lens.

* * * * *